(12) United States Patent
Krishnamachari et al.

(10) Patent No.: US 11,424,798 B2
(45) Date of Patent: Aug. 23, 2022

(54) MULTI-INPUT-MULTI-OUTPUT ACCESS POINTS HAVING SWITCHABLE GROUND ELEMENTS FOR IMPROVED ISOLATION AND RELATED METHODS

(71) Applicant: ARRIS Enterprises LLC, Suwanee, GA (US)

(72) Inventors: Anand Krishnamachari, Campbell, CA (US); Rajesh Koganti, Santa Clara, CA (US); Douglas Kough, San Jose, CA (US); James Jervis, Santa Clara, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/489,904

(22) Filed: Sep. 30, 2021

(65) Prior Publication Data

US 2022/0109477 A1 Apr. 7, 2022

Related U.S. Application Data

(60) Provisional application No. 63/088,084, filed on Oct. 6, 2020.

(51) Int. Cl.
 *H04B 7/02* (2018.01)
 *H04B 7/06* (2006.01)
 *H04W 88/08* (2009.01)
(52) U.S. Cl.
 CPC ........... *H04B 7/0608* (2013.01); *H04W 88/08* (2013.01)
(58) Field of Classification Search
 CPC .................................................. H04B 7/0608

USPC ................ 375/267, 260, 259, 219, 295, 316
See application file for complete search history.

(56) References Cited

U.S. PATENT DOCUMENTS

| | | |
|---|---|---|
| 7,292,198 B2 | 11/2007 | Shtrom et al. |
| 2013/0109449 A1 | 5/2013 | Desclos et al. |
| 2016/0099501 A1 | 4/2016 | Rowson et al. |
| 2017/0295595 A1* | 10/2017 | Yang ................. H04W 74/0816 |

(Continued)

OTHER PUBLICATIONS

"Notification of Transmittal of the International Search Report and the Written Opinion of the International Searching Authority, or the Declaration for corresponding International Application No. PCT/US2021/051854, dated Jan. 26, 2022, (22 pages)".

(Continued)

*Primary Examiner* — Zewdu A Kassa
(74) *Attorney, Agent, or Firm* — Stewart A. Wiener; Myers Bigel, P.A.

(57) ABSTRACT

An access point includes a data encoder, a first transmit/receive chain coupled to the data encoder, the first transmit/receive chain including a first radio and a first antenna that are configured to transmit RF signals in a first frequency band, a second transmit/receive chain coupled to the data encoder, the second transmit/receive chain including a second radio and a second antenna that are configured to transmit RF signals in the first frequency band, and a switchable ground element that comprises a conductive member that is connected to a ground reference via a switch. The first antenna is separated from the second antenna by a distance that is less than one wavelength of a center frequency of the first operational frequency band.

20 Claims, 8 Drawing Sheets

(56) References Cited

U.S. PATENT DOCUMENTS

2020/0144702 A1    5/2020   Rowson et al.

OTHER PUBLICATIONS

"P. Mathur, A. Raveendran, S. Appusamy and S. Raman, "Yagi-Uda-Inspired Pattern Reconfigurable MIMO Antenna with Suppressed Harmonics and Minimum Parasitic Presence for WLAN Applications," 2020 14th European Conference on Antennas and Propagation (EuCAP), 2".

* cited by examiner

MULTI-INPUT-MULTI-OUTPUT ACCESS POINTS HAVING SWITCHABLE GROUND ELEMENTS FOR IMPROVED ISOLATION AND RELATED METHODS

CROSS-REFERENCE TO RELATED APPLICATION

The present application claims priority under 35 U.S.C. § 119 to U.S. Provisional Patent Application Ser. No. 63/088,084, filed Oct. 6, 2020, the entire content of which is incorporated herein by reference as if set forth fully herein.

FIELD

The present invention relates generally to communications systems and, more particularly, to access points for wireless communications networks that can operate using multi-input-multi-output ("MIMO") transmission techniques.

BACKGROUND

A wireless local area network refers to a network that operates in a limited geographic area (e.g., within a home, school, store, campus, shopping mall, etc.) that interconnects two or more electronic devices using wireless radio frequency ("RF") communications. Electronic devices owned or controlled by users of a wireless local area network, such as smartphones, computers, tablets, printers, appliances, televisions, lab equipment and the like (herein "client electronic devices"), can communicate with each other and/or access other networks (e.g., the Internet) over the wireless local area network. Since wireless communications are used, the client electronic devices can move throughout the area covered by the wireless local area network (e.g., as the users of the client electronic devices move) and remain connected to the network. Many wireless local area networks operate under a family of standards promulgated by the Institute of Electrical and Electronics Engineers (IEEE) that are referred to as the IEEE 802.11 standards. Wireless local area networks operating under the IEEE 802.11 family of standards are commonly referred to as Wi-Fi networks. Client electronic devices that include a networking subsystem that includes a Wi-Fi network interface can communicate over Wi-Fi networks.

A Wi-Fi network includes one or more access points (also referred to as hotspots) that are typically installed at fixed locations throughout the area covered by the Wi-Fi network. Each access point may include a networking subsystem that has a IEEE 802.11-based network interface. The Wi-Fi network can include a single access point that provides coverage in a very limited area or may include tens, hundreds or thousands of access points that provide in-building and/or outdoor coverage to a large campus or region. A client electronic device "associates" with an access point in order to gain access to the Wi-Fi network. Client electronic devices communicate with each other and/or with wired devices that are connected to the Wi-Fi network through the access points. The Wi-Fi network typically includes one or more gateways that may be used to provide Internet access to the client: electronic devices.

Wireless local area networks that operate under the IEEE 802.11 standard have been widely deployed. The access points in these networks are typically controlled by one or more on-premise controllers, off-premise controllers and/or Cloud-based controllers. The access points may communicate with these controllers through wired and/or wireless connections. Most modern access points support Wi-Fi communications in both the 2.4 GHz and the 5 GHz frequency bands. Wi-Fi networks may alternatively or additionally operate in the 60 GHz frequency band, and the 6 GHz frequency band may be used for Wi-Fi communications in the future.

Access points are also commonly configured to support MIMO communications techniques. When MIMO transmission techniques are used, a data stream that is to be transmitted is broken into segments, and multiple of these segments are simultaneously transmitted, at the same frequency and using certain coding techniques, over multiple relatively uncorrelated transmission paths or "channels" between a transmitting station and a receiving station. For example, so-called 2xMIMO transmission technique (which involves simultaneously transmitting a data stream using two channels) is typically performed by simultaneously transmitting segments of a data stream at two orthogonal polarizations. A first set of data segments may be transmitted, for example, through a horizontally polarized antenna, and a second set of data segments may be simultaneously transmitted through a vertically polarized antenna. These two data streams may be highly uncorrelated since isolation levels between even col-located horizontally and vertically polarized antennas typically exceeds 15 dB. Higher order MIMO transmission technique involve transmitting over additional channels. For example, two channels that transmit through horizontally polarized antennas and two channels that transmit through vertically polarized antennas may be used to support 4xMIMO transmission. In such a system, the antennas having the same polarization are typically spaced at least one wavelength apart so that the transmissions on the different channels will exhibit a sufficient a level of decorrelation so that the data segments may be recovered at the receiver of the client electronic device.

Currently, the trend is towards the use of higher order MIMO transmission techniques and physically smaller access points. In some applications, such as hospitality, customers may demand very small access points. This may lead to challenges in locating the antennas within an access point so that their transmissions will be sufficiently decorrelated.

SUMMARY

Pursuant to embodiments of the present invention, communication methods are provided. Pursuant to these methods, an access point is provided that includes a data encoder, a first transmit/receive chain that is coupled to the data encoder, the first transmit/receive chain including a first antenna that is configured to operate in a first frequency band, a second transmit/receive chain that is coupled to the data encoder, the second transmit/receive chain including a second antenna that is configured to operate in the first frequency band, and a switchable ground element that includes a conductive member that is connected to a ground reference via a switch. An antenna pattern for the first antenna is selected from a plurality of antenna patterns, where the selected antenna pattern is one of the plurality of antenna patterns that is formed when the conductive member of the switchable ground element is coupled to the ground reference. A first data rate is identified at which packets can be transmitted to a client electronic device using the first transmit/receive chain with the first antenna set to the selected antenna pattern. The first data rate is the highest data rate in a set of data rates at which the packets can be transmitted to the client electronic device with the first antenna set to the selected antenna pattern while satisfying a selected performance criterion.

In some embodiments, the method may further comprise identifying a second data rate at which packets can be transmitted to the client electronic device using the first transmit/receive chain, where the second data rate is identified using a beamforming algorithm for the first antenna. In some embodiments, the second data rate may be the highest data rate in the set of data rates at which the packets can be transmitted to the client electronic device while satisfying the selected performance criterion when the first antenna has one of the plurality of antenna patterns that is identified by the beamforming algorithm. The method may further include transmitting packets to the client electronic device at the higher of the first data rate and the second data rate, where the antenna pattern for the first antenna is the one of the antenna patterns that is identified by the beamforming algorithm if the second data rate exceeds the first data rate, and is the selected antenna pattern if the first data rate exceeds the second data rate.

In some embodiments, identifying the second data rate may comprises (1) using the beamforming algorithm to identify one of the plurality of antenna patterns for the first antenna to use with respect to communications between the access point and the client electronic device, (2) transmitting additional packets through the first antenna to the client electronic device using the identified antenna pattern, where the additional packets are transmitted at two or more data rates in the set of data rates, and (3) identifying whether the selected performance criterion is met for the additional packets transmitted at each of the two or more data rates in the set of data rates to identify the second data rate.

In some embodiments, identifying the first data rate may comprise (1) setting the electronically controlled switch of the switchable ground element so that the conductive member is electrically connected to the ground reference, (2) transmitting additional packets to the client electronic device using the first transmit/receive chain with the first antenna set to the selected antenna pattern, where the additional packets are transmitted at two or more data rates in the set of data rates, and (3) identifying whether the selected performance criterion is met for the additional packets transmitted at each of the two or more data rates in the set of data rates to identify the first data rate.

In some embodiments, the switchable ground element may be configured to increase isolation between the first and second antennas when the conductive ground member is coupled to the ground reference.

In some embodiments, the conductive member may be a reflector.

In some embodiments, the switchable ground element may be positioned between the first antenna and the second antenna.

In some embodiments, the first and second antennas may be separated by a distance that is less than a wavelength at a center frequency of the operating frequency band of the first antenna.

In some embodiments, the performance criterion may be a packet error rate.

Pursuant to further embodiments of the present invention, access points are provided that include a data encoder, a first transmit/receive chain coupled to the data encoder, the first transmit/receive chain including a first radio and a first antenna that are configured to transmit radio frequency ("RF") signals in a first operational frequency band, a second transmit/receive chain coupled to the data encoder, the second transmit/receive chain including a second radio and a second antenna that are configured to transmit RF signals in the first operational frequency band, and a switchable ground element that comprises a conductive member that is connected to a ground reference via a switch. The first antenna is separated from the second antenna by a distance that is less than one wavelength of a center frequency of the first operational frequency band.

In some embodiments, the conductive member may be configured to be resonant at a center frequency of the first operational frequency band.

In some embodiments, the first antenna and the second antenna may be configured to transmit signals having a same polarization.

In some embodiments, a first distance between the first antenna and the second antenna may be greater than a second distance between the first antenna and the switchable ground element and may also be greater than a third distance between the second antenna and the switchable ground element, and the switchable ground element may comprise a reflector.

In some embodiments, a first distance between the first antenna and the second antenna may be less than either a second distance between the first antenna and the switchable ground element or a third distance between the second antenna and the switchable ground element, and the switchable ground element may be a director.

In some embodiments, the first radio and the second radio may be mounted on a main printed circuit board of the access point, and the first antenna may be formed in the main printed circuit board. In such embodiments, the second antenna and the conductive member of the switchable ground element may also be formed in the main printed circuit board.

Pursuant to still further embodiments of the present invention, methods of operating an access point having a first antenna and a second antenna and a switchable ground element that comprises a conductive member that is connected to an electrical ground reference via an electronically controlled switch are provided. Pursuant to these methods, a first data rate at which packets can be transmitted to a client electronic device through the first antenna when the first antenna unit is set to have a selected antenna pattern that is an antenna pattern that is formed when the conductive member of the switchable ground element is coupled to ground is identified The first data rate is the highest data rate in a set of data rates at which the packets can be transmitted while satisfying a selected performance criterion. A second data rate at which packets can be transmitted to the client electronic device through the first antenna using an antenna pattern that is identified by a beamforming algorithm is also identified. Packets are transmitted to the client electronic device at the higher of the first data rate and the second data rate, where the antenna pattern for the first antenna is the antenna pattern identified by the beamforming algorithm if the second data rate exceeds the first data rate, and is the selected antenna pattern if the first data rate exceeds the second data rate.

In some embodiments, the switchable ground element may be configured to increase isolation between the first and second antennas when coupled to the ground reference.

In some embodiments, the conductive member may be configured to be resonant at the center frequency of the first operational frequency band.

In some embodiments, the first antenna and the second antenna may be configured to transmit signals having a same polarization.

In some embodiments, a first distance between the first antenna and the second antenna may be greater than a second distance between the first antenna and the switchable ground element and may also be greater than a third distance between the second antenna and the switchable ground element, and the switchable ground element may be a reflector.

In some embodiments, a first distance between the first antenna and the second antenna may be less than either a second distance between the first antenna and the switchable ground element or a third distance between the second antenna and the switchable ground element, and the switchable ground element may be a director.

In some embodiments, a first radio that is connected to the first antenna and a second radio that is connected to the second antenna are both mounted on a main printed circuit board of the access point, and the first antenna is formed in the main printed circuit board.

In some embodiments, the second antenna and the conductive member of the switchable ground element are also formed in the main printed circuit board.

In some embodiments, the first and second antennas may be separated by a distance that is less than a wavelength at a center frequency of the operating frequency band of the first antenna.

In some embodiments, the performance criterion may be a packet error rate.

DETAILED DESCRIPTION

Figure 1:
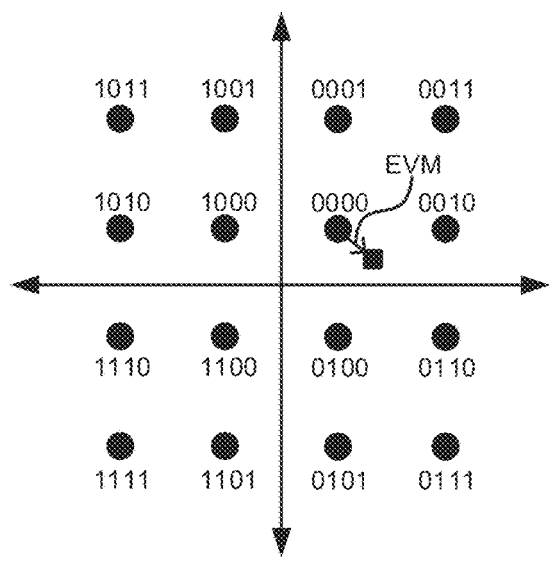
FIG. 1 is a graph of the IQ plane illustrating the error vector magnitude of a symbol transmitted using a 16-QAM modulation technique.

The total throughput for communications between an access point and a client electronic device is a function of (1) the data rate used for the transmissions and (2) the number of failed transmissions (which require retransmission of the data). Typically, if the number of failed transmissions becomes too high, the data rate for the transmissions will be reduced to allow for additional coding or other techniques that make it more likely that the data can be correctly received. Error Vector Magnitude or "EVM" is a commonly used measure as to how accurately a wireless device is transmitting symbols within a constellation of symbols. FIG. 1 illustrates the symbols for a radio that is transmitting using a 16-QAM digital modulation technique. The sixteen black circles in the graph of FIG. 1 represent the sixteen different 4-bit symbols that can be transmitted, represented in the in-phase/quadrature-phase or "IQ" plane. If the radio wants to transmit the symbol 0000, the radio is set to transmit a signal that plots on the IQ plane at the location of the black dot labelled 0000. Unfortunately, wireless transmitters are not formed of ideal components and hence a wireless device that is attempting to transmit symbol 0000 will typically not transmit a signal that is located exactly at the block dot labelled 0000 in FIG. 1. Instead, the signal that is actually transmitted will typically be located somewhere near the block dot labelled 0000, as shown by the small square in FIG. 1. The vector in FIG. 1 that connects the small square (the actual transmission) to the circle labelled 0000 represents the error vector associated with the transmission. The magnitude of this vector is the EVM.

The modulation and coding scheme or "MCS" used for any given transmission in a Wi-Fi network determines how many spatial data streams are used and the modulation type and coding rate that is used on those streams. The MCS data rate refers to the number of data bits transmitted per unit of time for a given MCS scheme. In order to transmit at high MCS data rates, the EVM of the transmitting wireless device typically must be very low. Unfortunately, if the isolation between the antennas of the wireless device is not high (e.g., because the antennas are located in close proximity to each other), then degradation in the EVM occurs, resulting in a shift to lower MCS data rates. Generally speaking, this results in reduced throughput. Moreover, in wireless devices in which the antennas are formed as printed circuit elements on a common printed circuit board, the reduction in isolation (and hence the reduction in the supportable data rate) may be more pronounced as the antennas share a common ground reference.

Pursuant to embodiments of the present invention, access points are provided that include one or more switchable ground elements that may be positioned, for example, between a pair of antennas (e.g., between two antennas used for MIMO communications). Each switchable ground element may comprise a conductive element that is switchably connected to a ground reference such as the ground plane of a printed circuit board of the access point. The switchable ground element may comprise, for example, a trace on the printed circuit board or a monopole element extending from the printed circuit board that is connected to the ground reference through an electronically controlled switch such as a PIN diode, a transistor or the like. When the conductive member of the switchable ground element is electrically connected to the ground plane, it acts to increase the isolation between the two antennas it is situated between. When the conductive member of the switchable ground element is disconnected from the ground plane (and hence left electrically floating), it becomes almost transparent to the antennas (i.e., it does not impact the antenna patterns or "antenna beams" of the antennas).

Conductive elements that can be selectively coupled to a ground reference are presently being used in Wi-Fi access points. In particular, so-called reflectors and directors are conductive elements that are connected to a ground plane through an electronic switch such as a PIN diode that are used to shape the antenna beam formed by an antenna of the access point. Directors are elements act to "pull" the RF energy emitted by an antenna in the direction of the director, thereby increasing the gain of the antenna pattern in the direction of the director (and reducing the gain in other directions). Reflectors are elements tend to reflect the RF energy emitted by an antenna back toward the antenna, thereby increasing the gain of the antenna pattern in a direction opposite of a vector extending between the antenna and the reflector and reducing the gain in the direction of the reflector. The directors and/or reflectors are electrically connected or disconnected to the ground plane based on an algorithm that attempts to select a combination of an antenna pattern and an MCS data rate that will result in the highest throughput.

The access points and methods according to embodiments of the present invention are based on the realization that when a client electronic device is located in close proximity to an access point, the degradation in EVM due to poor isolation between antennas can prevent the use of high MCS data rates. Thus, when transmitting to client electronic devices that are located near the access point, the switchable ground element may always be connected to the ground reference to increase the isolation between closely-located antennas. In contrast, when transmitting to client electronic devices that are farther away from the access point, the switchable ground element may be disconnected from the ground reference or may be selectively coupled to the ground reference in order to "steer" a main lobe of the antenna beam in the direction of the client electronic device. The switchable ground element may be "turned off" (i.e., disconnected from the ground reference) or used for beamforming purposes because when clients are far away from the access point, factors other than antenna isolation such as free space loss or interference may dominate so as to determine the achievable throughput.

Pursuant to some embodiments of the present invention, a performance metric may be used to set the MCS data rate and/or to determine whether or not to couple the conductive members of one or more switchable ground elements to a ground reference. In one example embodiment, the performance metric may be the packet error rate for transmissions from the access point to a particular client electronic device. For example, the access point may use a beamforming algorithm to select an optimum antenna pattern to use for communications between the access point and the client electronic device, and may then determine the highest data rate that can be used for transmissions from the access point to the client electronic device using the selected antenna pattern that will meet a given packet error rate value (e.g., a packet error rate of less than ten). The access point may then turn off the beamforming algorithm, couple conductive members of one or more switchable ground elements to ground, and then determine the highest data rate that can meet the selected performance criterion under these transmission conditions. The access point may then compare the two identified "highest" data rates to determine whether to use the antenna pattern identified by the beamforming algorithm or to instead use the switchable ground elements to increase antenna isolation for transmissions from the access point to the client electronic device.

Embodiments of the present invention will now be discussed in greater detail with reference to FIGS. 2-12.

Figure 2:
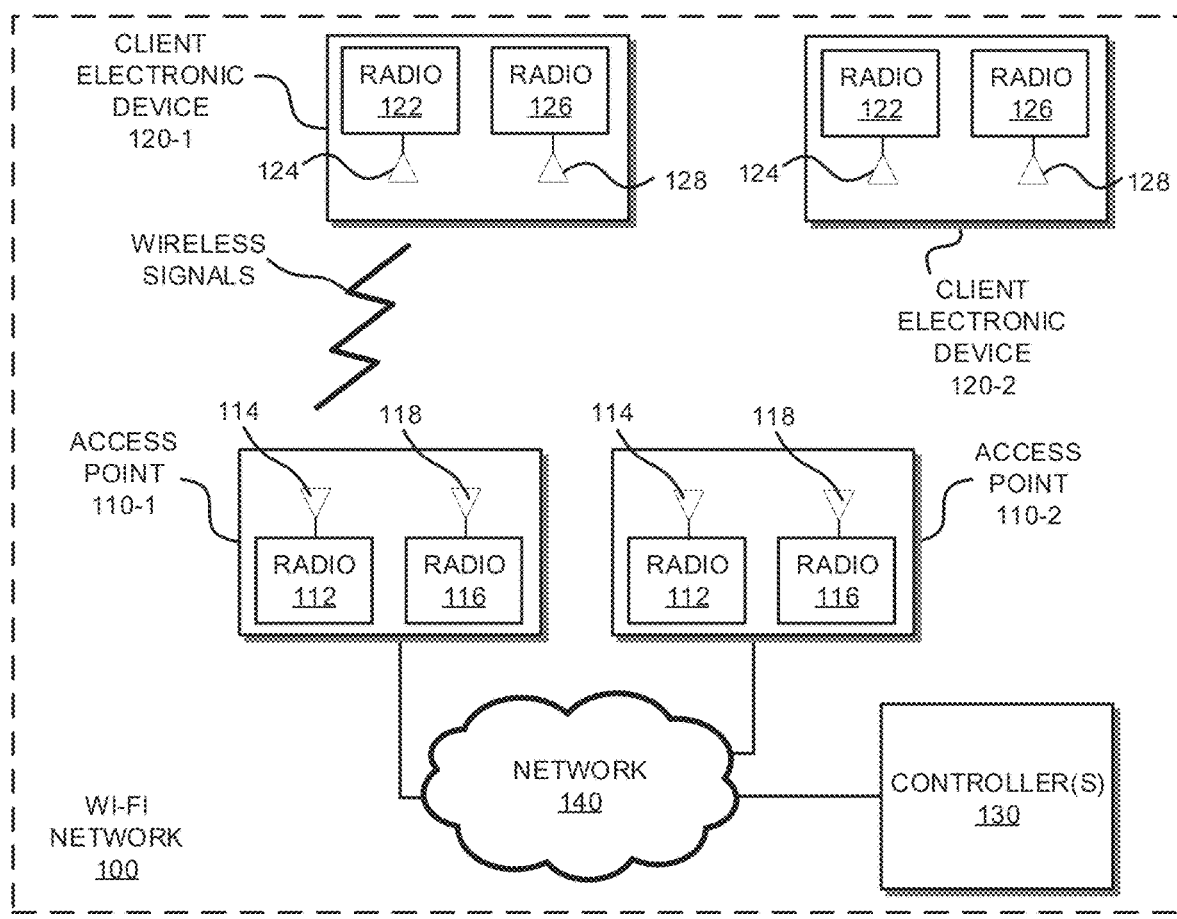
FIG. 2 is a highly simplified block diagram of a Wi-Fi network.

FIG. 2 is a block diagram illustrating a very simple, example Wi-Fi network 100 in which access points according to embodiments of the present invention may be utilized. As shown in FIG. 2, the Wi-Fi network 100 may include one or more access points 110 (e.g., access points 110-1, 110-2), one or more client electronic devices 120 (such as cellular telephones, computers, tablets, printers and a wide range of other Wi-Fi-capable electronic devices), and one or more optional controllers 130. The access points 110 may communicate with one or more of the client electronic devices 120 using wireless communication that is compatible with an IEEE 802.11 standard. Thus, the wireless communication may occur in, for example, the 2.4 GHz frequency band, the 5 GHz frequency band and/or the 60 GHz frequency band. However, other frequency bands may be used, and it will be appreciated that future versions of the IEEE 802.11 standards may operate in additional frequency bands (e.g., the 6 GHz frequency band) or different frequency bands. Note that herein when multiple instances of the same element are shown in the figures, they may be designated by two part reference numerals. Herein such elements may be referred to individually by their full reference numeral (e.g., access point 110-2) and collectively by the first part of their reference numeral (e.g., the access points 110).

The access points 110 may also communicate with the one or more optional controllers 130 via a network 140, which may comprise, for example, the Internet, an intra-net and/or one or more dedicated wired or wireless communication links. It will also be appreciated that some access points 110 may only be connected to the network 140 through other access points 110 (e.g., in a mesh network implementation). Note that the optional controllers 130 may be at the same location as the other components in Wi-Fi network 100 or may be located remotely (e.g., cloud based controllers 130). The access points 110 may be managed and/or configured by the one or more optional controllers 130. The access points 110 may communicate with the controller(s) 130 or other services using wireless communications and/or using a wired communication protocol, such as a wired communication protocol that is compatible with an IEEE 802.3 standard. The access points 110 may provide the client electronic devices 120 access to network 140. The access points 110 may be physical access points or may be virtual or "software" access points that are implemented on a computer or other electronic device. While not shown in FIG. 2, the Wi-Fi network 100 may include additional components or electronic devices, such as, for example, a router.

The access points 110 and the client electronic devices 120 may communicate with each other via wireless communication. The access points 110 and the client electronic devices 120 may wirelessly communicate by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc. Received frames or packets may, for example, be demodulated to extract the frame or packet from the received wireless signals to acquire the frame or packet, and may be further processed (e.g., decoded) to determine information (e.g., data bits) contained within the frame or packet.

In the description that follows, operations will be described in which a frame or a packet is processed by an access point 110 or a client electronic device 120. The processing operations may include: receiving wireless signals with the frame or packet; decoding/extracting the frame or packet from the received wireless signals to acquire the frame or packet; and processing the frame or packet to determine information contained in the frame or packet As described further below with reference to FIG. 12, the access points 110, client electronic devices 120 and/or the controllers 130 may include subsystems, such as a networking subsystem, a memory subsystem and a processor subsystem. The networking subsystems may include radios that are used to wirelessly communicate with each other. For example, the access points 110 may include one or more first radios 112 and one or more first antennas 114 that are configured to transmit and receive signals in a first frequency band (e.g., the 2.4 GHz frequency band), and a second radio 116 and one or more second antennas 118 that are configured to transmit and receive signals in a second frequency band (e.g., the 5 GHz frequency band). Similarly, the client electronic devices likewise may include a first radio 122 one or more first antennas 124 that are configured to transmit and receive signals in the first frequency band (e.g., the 2.4 GHz frequency band), and a second radio 126 and one or more second first antennas 128 that are configured to transmit and receive signals in the second frequency band (e.g., the 5 GHz frequency band). For ease of discussion herein, the first frequency band will be assumed to be the 2.4 GHz frequency band and the second frequency band will be assumed to be the 5 GHz frequency band, although the present disclosure is not limited thereto.

As can be seen in FIG. 2, wireless signals (represented by jagged lines) may be transmitted from an access point (e.g., access point 110-2 to a client electronic device (e.g., client electronic device 120-2). When MIMO transmission techniques are used, the access point 110-2 will have multiple transmit/receive chains so that multiple signals may be simultaneously transmitted from the access point 110-2 to the client electronic device 120-2 to increase the throughput (e.g., four separate data streams may simultaneously be transmitted through four separate access point antennas 114).

The communication between client electronic device 120-1 and access point 110-1 may be characterized by a variety of performance metrics, including, for example, a data rate, throughput (i.e., the data rate for successful transmissions), an error rate (such as a retry or resend rate), a signal-to-noise ratio, a ratio of number of bytes successfully communicated during a time interval to an estimated maximum number of bytes that can be communicated in the time interval (the latter of which is sometimes referred to as the "capacity" of a communication channel or link), and/or a ratio of an actual data rate to an estimated data rate (which is sometimes referred to as "utilization").

Figure 3:
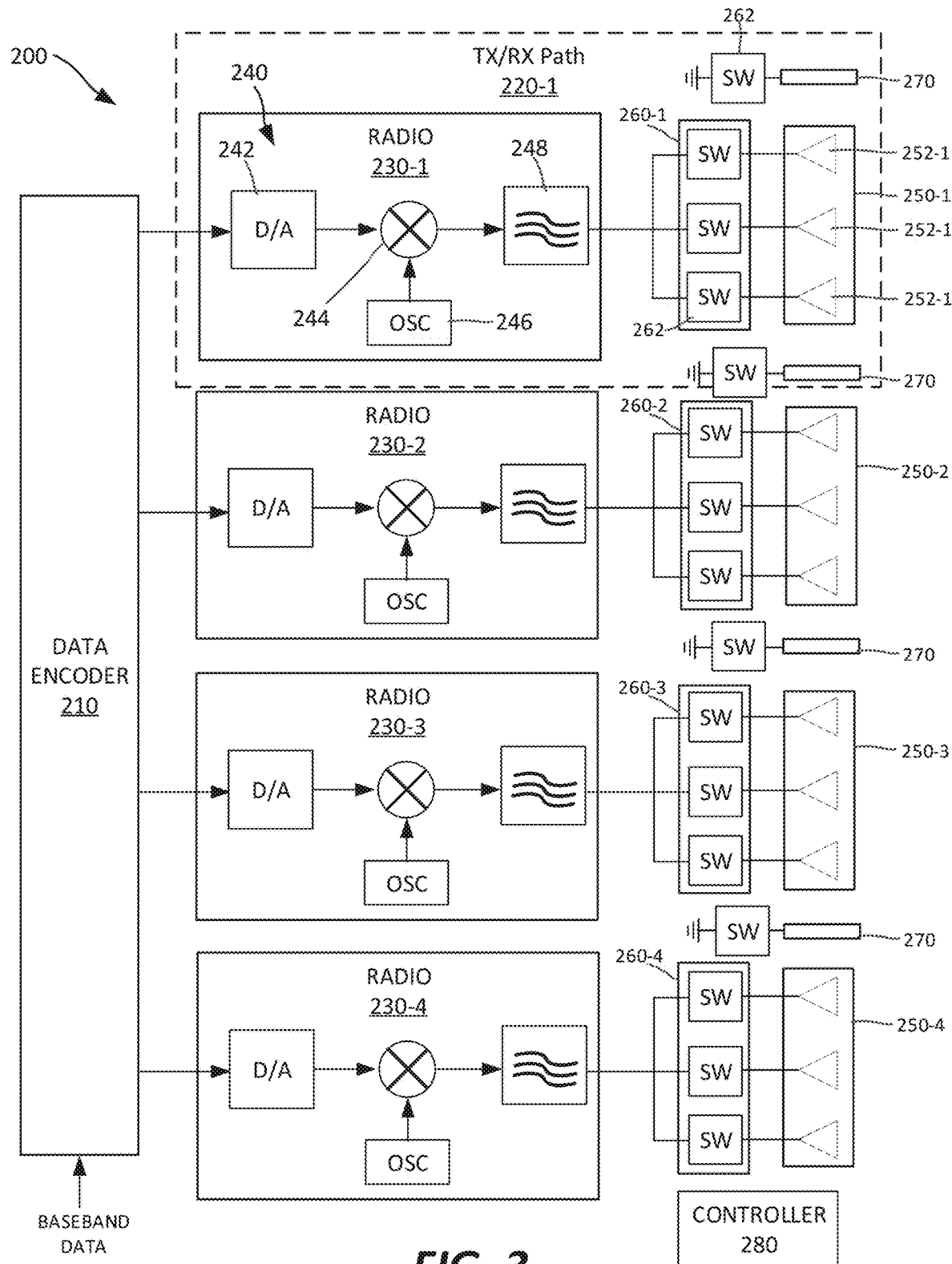
FIG. 3 is a block diagram of an access point that is configured for MIMO transmission.

FIG. 3 is a block diagram of an access point 200 that is configured for MIMO transmission. The access point 200 includes multiple radios 230 and multiple antennas 250 that form a plurality of transmit/receive chains 220. To simplify the figure, only the first frequency transmit/receive chains 220 are shown (e.g., the 2.4 GHz transmit/receive chains), and the second frequency transmit/receive chains are omitted from the drawing. The second frequency transmit/receive chains may be configured identically to the first frequency transmit/receive chains as shown in FIG. 3, and there can be the same number or a different number of second frequency transmit/receive chains. Additionally, only the transmit paths are shown in each radio 230 to further simplify the block diagram of FIG. 3. It will be appreciated that access points engage in two-communication and hence the actual access point 200 will include a receive path that corresponds to each transmit path with appropriate circuitry such as a filter, a downconverter, an analog-to-digital converter and the like, along with appropriate switching circuitry for connecting both the transmit and receive paths to the antennas 250 (e.g., duplexers or switches).

As shown in FIG. 3, the access point 200 includes a data encoder 210 that encodes data such as a baseband digital bit stream into a form suitable for MIMO transmission to a client electronic device via parallel transmit/receive chains 220 (only the first of the four transmit/receive chains 220-1 is expressly labelled in FIG. 3). Data encoder 210 may include data encoding elements such as direct sequence spread-spectrum (DSSS) or Orthogonal Frequency Division Multiplex (OFDM) encoding mechanisms to generate baseband data streams in an appropriate format. Data encoder 210 may include hardware and/or software elements for converting received data into data packets compliant with the IEEE 802.11 format. Such software elements may be embedded in memory or other non-transitory computer readable storage media and coupled to appropriate processing components. In some instances, the appropriate conversion elements may be implemented in the context of a hardware element such as an application specific processor.

Each transmit/receive chain 220 may include a radio 230 and an antenna 250. Each radio 230 includes transmit circuitry 240 in the form of a digital-to-analog converter 242, an upconverter 244 (including a local oscillator 246) and a filter 248. As noted above, the receive circuitry is not shown in FIG. 3. Each radio 230 may be configured to upconvert baseband data streams that are received from the data encoder 210 to RF signals, and to downconvert RF signals received from their associated antenna 250 to baseband streams that are passed to the data encoder 210.

Each antenna 250 is part of a respective one of the transmit/receive chains 220. In the illustrated embodiment, each antenna 250 includes multiple antenna elements 252-1 through 252-3 that may be selectively coupled to an associated radio 230 via a respective switching circuit 260-1 through 260-4. Each antenna element 252 may be individually selectable such that it is, or is not, coupled to its associated radio 230. By selecting various combinations of the antenna elements 252-1 through 252-3, the antenna 250 may vary the shape of the radiation pattern or "antenna beam" that is formed when the antenna transmits or receives an RF signal. For example, each antenna 250 may be designed so that if all of the antenna elements 252 are coupled to an associated radio 230, the antenna 250 will form a generally omnidirectional radiation pattern. If on the other hand, one or more of the antenna elements 252-1 through 252-3 are switched off, the antenna 250 may form a more directional antenna beam that has increased gain in one or more selected directions and reduced gain in other directions. It should also be noted herein that an "omnidirectional antenna pattern" refers to an antenna pattern that has generally equal gain in all directions on a first side of a ground plane.

The switching networks 260 that are used to select which antenna elements 252 of a given antenna 250 are connected to an associated radio 230 may each be implemented as a power divider and a plurality of individual switches 262 such as, for example, be PIN diodes, gallium arsenide field-effect transistors (GaAs FETs), or other RF switching devices. The individual switches 262 may operate as single-pole, single-throw switches to switch each antenna element 252 either on or off (i.e., couple or decouple each of the antenna elements 252 to an associated radio 230). A series of control signals may be applied via a control bus (not shown) to bias each switch 262. For example, if the switches 262 are implemented using PIN diodes, when a given PIN diode 262 is forward biased and conducting a DC current, the PIN diode 262 will be "on", and the corresponding antenna element 252 is connected to its associated radio 230. When the PIN diode 262 is reverse biased, it will be "off" (non-conducting), and the corresponding antenna element 252 will not be is connected to its associated radio 230.

The access point 200 may also include pattern shaping elements 270. Each pattern shaping element 270 may comprise, for example, a conductive element that is implemented in, or extending from, a main printed circuit board (not shown) of the access point 200. The pattern shaping elements 270 may include directors and reflectors. Each pattern shaping element may be switchably coupled to a ground reference using, for example, a PIN diode or other suitable switch. Directors are known in the art and refer to pattern shaping elements that tend to distort the antenna beam in the direction of the director when the director is coupled to ground, thereby increasing the gain of the antenna beam in the direction of the director and decreasing the gain in other directions. Reflectors are also known in the art and refer to pattern shaping elements that tend to distort the antenna beam in a direction extending away from the reflector along an axis extending between the reflector and the antenna when the reflector is coupled to ground, thereby increasing the gain of the antenna beam in the direction opposite of the reflector and decreasing the gain in other directions. The reflectors and directors may be metal objects having any shape that are placed near an antenna. More than one pattern shaping element 270 may be located adjacent each antenna. As shown in FIG. 3, additional individual switches 262 (e.g., PIN diodes) may be used to selectively couple each pattern shaping element 270 to ground.

The access point 200 further includes include a controller 280. The controller 280 may be coupled to one or more of the data encoder 210, the radios 230 and the switching circuit 260 via a control bus 282. The controller 280 may include hardware (e.g., a microprocessor and logic) and/or software elements to control the operation of access point 200.

The controller 280 may select a particular configuration of the elements 252 of a particular antenna 250 that minimizes interference over the wireless link between the transmit/receive chain 220 including the antenna 250 and a remote receiving device (e.g., a client electronic device). If the wireless link experiences interference or changes or disturbances in the wireless channel between the access point 200 and the remote receiving device, the controller 280 may select a different configuration of selected antenna elements 252 to change the resulting antenna pattern in a way that reduces the interference. The controller 280 may alternatively select a configuration of antenna elements 252 that increase the gain of the antenna pattern in the direction of the remote receiving device. Alternatively or additionally, the controller 280 may change which of the pattern shaping elements 270 are coupled to ground. For example, the controller 280 may select a configuration of selected antenna elements 252 of antenna 250-2 and pattern shaping elements 270 that are associated with antenna 250-2 that generates an antenna pattern having a high gain between the access point 200 and the remote receiving device. Alternatively, the controller 280 may select a configuration that provides less than maximum gain, but which reduces interference in the wireless link.

MIMO transmission techniques rely on the parallel transmit/receive chains 220 being sufficiently decorrelated from each other so that multiple data streams may be transmitted at the same time and at the same frequency. Typical techniques for decorrelating the transmit/receive chains 220 are by polarization diversity and spatial diversity. Polarization diversity can be obtained by transmitting a first data stream using a transmit/receive chain 220 that includes an antenna 250 having a first polarization (e.g., horizontal polarization) and by simultaneously transmitting a second data stream using a transmit/receive chain 220 that includes an antenna 250 having a second polarization that is orthogonal to the first polarization (e.g., vertical polarization). Spatial diversity can be obtained by locating the antennas 250 having the same polarization sufficiently far apart so that coupling between the antennas 250 is low. Typically, a minimum spacing to achieve adequate decorrelation is about a wavelength corresponding to the center frequency of the operating frequency band of the transmit/receive chain 220.

While four transmit/receive chains 220 are illustrated in FIG. 3 (so that the access point is configured for 4xMIMO operation in the first frequency band), it will be appreciated that other numbers of transmit/receive chains 220 may be used for any frequency band. For example, in other embodiments, the access point 200 may be configured for 2xMIMO or for 8xMIMO operation in any given frequency band.

The current trend is to reduce the physical footprint of Wi-Fi access points while also increasing the capacity that the access point can support by, for example, configuring the access points to support MIMO transmission techniques. With the introduction of MIMO transmission techniques (and particularly higher order MIMO such as 4xMIMO or 8xMIMO), the number of antennas included in an access point increases. With the size of the access points generally being reduced, this results in the antennas being located in closer proximity to each other. In some case, it may be difficult to space the antennas far enough apart to obtain sufficient decorrelation between some of the transmit/receive chains.

A wireless link in a Wi-Fi network between an access point and a client electronic device may be susceptible to interference from other access points or radio frequency transmitting devices in the vicinity of the access point (e.g., client electronic devices, electronic devices communicating in other wireless networks and/or electronic devices emitting noise in the operating frequency band of the Wi-Fi network). Wireless links in a Wi-Fi network may also be effected by other changes or disturbances in the wireless link environment between an access point and remote receiving node. In some instances, the interference and changes/disturbances may degrade the wireless link, thereby forcing communication at a lower data rate.

The data rate that maximizes throughput for communications between an access point and a client electronic device in a Wi-Fi network is a function of a number of factors including, among other things, the antenna pattern of the access point, the distance between the access point and the client electronic device, the number and types of objects interposed between the two devices, interference in the shared channel, etc. When the access point transmits data using MIMO transmission techniques, the isolation between the transmitting antennas of the access point may be another important factor, as poor isolation results in higher EVM, as explained above with reference to FIG. 1. Access points which have antennas with configurable antenna patterns (because the antenna has switchable antenna elements and/or switchable pattern shaping elements) typically employ a beamforming algorithm that selects an antenna pattern and data rate that "optimizes" throughput. In order to quickly identify such a combination of antenna pattern and data rate, these beamforming algorithms do not test all possible combinations of antenna patterns and data rates, but instead test a small number of combinations that are "intelligently" selected, and hence may not identify the true optimum combination. Moreover, these beamforming algorithms focus on identifying antenna patterns that direct the peak gain in the direction of the client electronic device and/or have lower gain in direction(s) of interference source(s).

The present invention is based on, among other things, a realization that insufficient isolation between antennas may be the limiting factor on the supportable data rate in certain circumstances. In particular, if a client electronic device is located in close proximity to an access point and isolation between two antennas of parallel MIMO transmit/receive chains is not high, then the poor isolation may be factor that suppresses the supportable data rate. Thus, in such circumstances, the antenna pattern is a secondary factor and throughput can be increased simply by increasing isolation between the antennas. In contrast, when the client device is located far from an access point, free space loss and other factors drive the supportable data rate, and the isolation between antennas, even if not high, has little impact on the suppresses the supportable data rate.

One way to potentially increase the isolation between two closely located antennas is to position one or more resonant elements between the two antennas. Pattern shaping elements such as directors and reflectors, when coupled to the ground plane, act as such resonant elements. Pursuant to embodiments of the present invention, access points that employ MIMO transmission techniques are provided that include switchable ground elements that may be used to selectively increase the isolation between one or more pairs of antennas. These switchable ground elements may comprise a conductive resonant structure that is coupled to a ground reference through a switching element such as, for example, a PIN diode. The switching elements may be coupled to ground to increase the isolation between the pairs of antennas in situations where insufficient isolation between the antennas is driving the access point to transmit at lower data rates. In contrast, when other factors (e.g., interference, free space loss, etc.) are dominating the data rate selection mechanism, then the resonant conductive element of the switchable ground element may be disconnected from the ground reference or, alternatively, used as a pattern shaping element (e.g., as a director or reflector) in order to shape the antenna beam in a desired fashion. The resonant element may comprise a resonant conductive member, and may be a director or a reflector in some cases.

Figure 4:
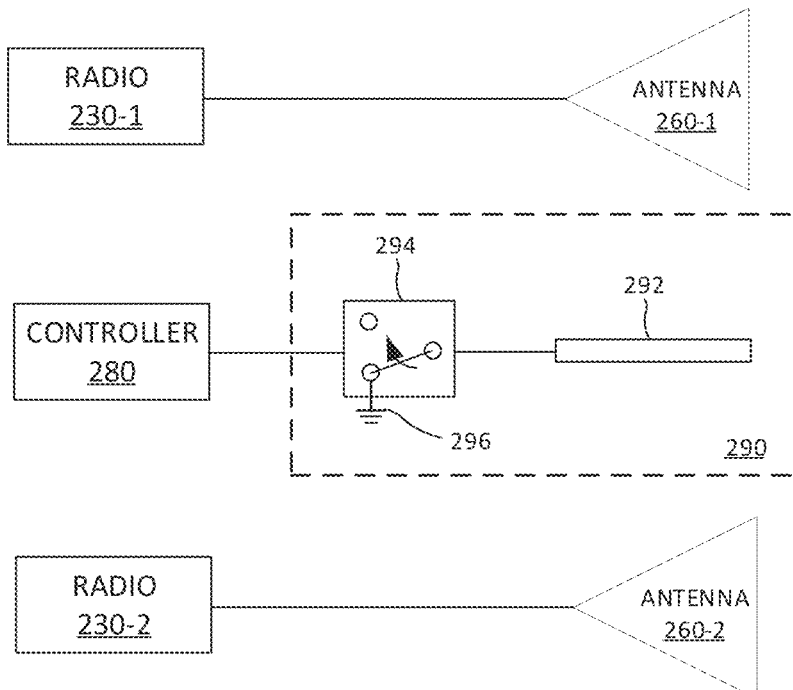
FIG. 4 is a schematic block diagram of a switchable ground element according to embodiments of the present invention

FIG. 4 is a schematic block diagram illustrating operation of a switchable ground element according to embodiments of the present invention. As shown in FIG. 4, an access point (e.g., access point 200 of FIG. 3) may have a first transmit/receive chain 220-1 that includes a first radio 230-1 and a first antenna 250-1 and a second transmit/receive chain 220-2 that includes a second radio 230-2 and a second antenna 250-2. The access point 200 further includes a switchable ground element 290 that may comprise, for example, a conductive element 292 such as a dipole, a monopole, a patch or the like and an electrically controlled switch 294 that can selectively couple the conductive member 292 to a ground reference 296. The switch 294 may be controlled by a control circuit. The control circuit may comprise, for example, the control circuit 280 that is used to control which antenna elements 252 of the antennas 250 are coupled to the respective radios 230 and/or which pattern shaping elements 270 are coupled to ground. The switchable ground element 290 may be positioned and/or configured to increase isolation between the first and second antennas 250-1, 250-2 when coupled to the ground reference.

In situations where isolation between the first and second antennas 250-1, 250-2 is the primary factor limiting performance, the conductive member 292 of the switchable ground element 280 may be coupled to the ground reference 296 through switch 294, which acts to increase the isolation between the first and second antennas 250-1, 250-2 and therefore allow for higher throughput. In situations where factors other than isolation between the first and second antennas 250-1, 250-2 are the primary factor limiting performance, then the conductive member 292 may be disconnected from the ground reference 296 or the state of the conductive member 292 (i.e., whether it is coupled to the ground reference 296) may be set using a beamforming algorithm that selects antenna patterns for the first and second antennas. A performance criterion may be used to decide whether or not isolation between the first and second antennas 250-1, 250-2 is the primary factor limiting performance. The performance criterion may be any of a wide variety of performance criterion, such as packet error rate, a signal-to-noise ratio, a capacity metric, a utilization metric, and the like. In some embodiments, the performance criterion may be an estimated or determined distance between the access point and the client electronic device.

Figure 5:
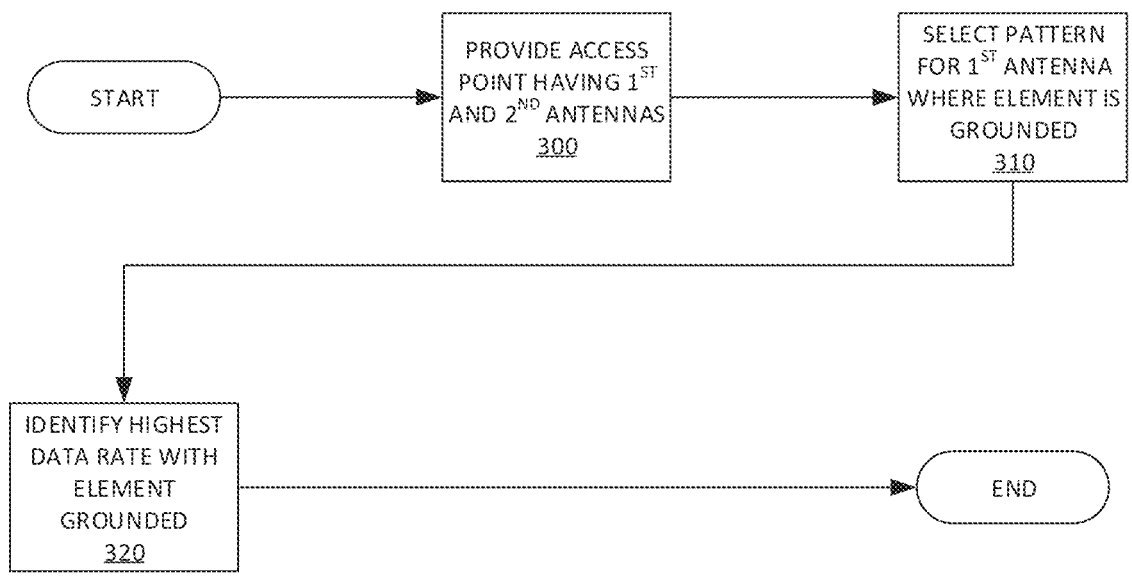
FIG. 5 is a flow chart of a communication method according to certain embodiments of the present invention.

FIG. 5 is a flow chart of an example of a communication method according to certain embodiments of the present invention. As shown in FIG. 5, operations may begin with an access point being provided that includes a data encoder, first and second transmit/receive chains that include respective first and second first frequency band antennas that are coupled to the data encoder, and a switchable ground element that includes a conductive member that is connected to a ground reference via a switch (Block 300). An antenna pattern is selected for the first antenna, where the selected antenna pattern is an antenna pattern that is formed when the conductive member of the switchable ground element is coupled to the ground reference (Block 310). As described above, the first antenna may be set to one of a plurality of possible antenna patterns by selectively connecting different antenna elements of the first antenna to the associated radio, and/or by selecting which ones of a plurality of pattern shaping elements associated with the first antenna are coupled to ground. The selected antenna pattern thus is selected from a subset of the plurality of antenna patterns for the first antenna in which the conductive member of the switchable ground element is coupled to the ground reference. Finally, a first data rate is identified at which packets can be transmitted to a client electronic device using the first transmit/receive chain with the first antenna set to the selected antenna pattern (Block 320). The first data rate may be the highest data rate in a set of data rates at which the packets can be transmitted to the client electronic device with the first antenna set to the selected antenna pattern while satisfying a selected performance criterion.

Figure 6:
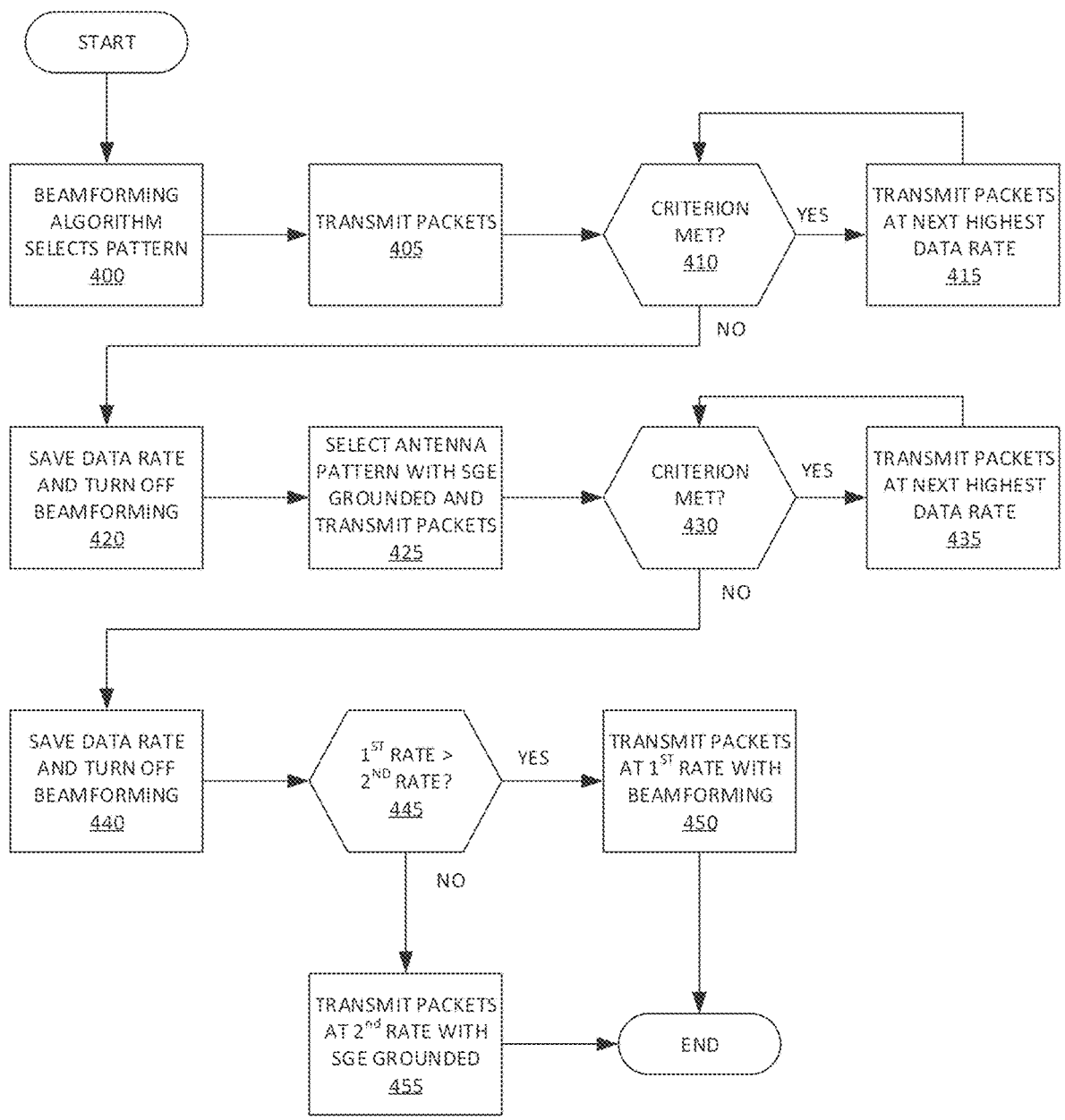
FIG. 6 is a flow chart of a communication method according to further embodiments of the present invention.

FIG. 6 is a flow chart illustrating a method of transmitting packets from an access point to a client electronic device according to further embodiments of the present invention. The access point may include at least first and second antennas that operate in the same frequency band and that are part of respective first and second transmit/receive chains that are used for MIMO communications. The access point may further include a switchable ground element. The switchable ground element may comprise, for example, a conductive element that is selectively coupled to a ground reference through a switch. The switchable ground element may be configured to increase a degree of isolation between the first and second antennas when the conductive member thereof is coupled to ground.

As shown in FIG. 6, operations may begin with a beamforming algorithm being used to select an antenna pattern for the first antenna (Block 400). Then, packets are transmitted from the access point to the client electronic device at an initial data rate via the first transmit/receive chain using the selected antenna pattern (Block 405). A determination may then be made as to whether the transmission met a selected performance criterion (Block 410). For example, the selected performance criterion might be a packet error rate of less than ten. If the selected performance criterion was satisfied, then the access point may transmit additional packets at a next higher data rate in a set of data rates (Block 415), and operations return to Block 410. If, on the other hand, at Block 410 it is determined that the selected performance criterion was not satisfied, then the last data rate at which packets were transmitted where the selected performance criterion was met is saved (e.g., in a memory), and the beamforming algorithm is turned off (Block 420).

Next, an antenna pattern is selected in which the switchable ground element ("SGE") is coupled to ground, and packets are transmitted from the access point to the client electronic device via the first transmit/receive chain with the first antenna set to the selected antenna pattern (which has the conductive element coupled to ground to increase the isolation between the first and second antennas) (Block 425). This transmission is made using an initial data rate. A determination may then be made as to whether the transmissions at Block 425 met the selected performance criterion (Block 430). If the selected performance criterion was satisfied, then the access point may transmit additional packets via the first transmit/receive chain with the first antenna set to the selected antenna pattern at a next higher data rate in the set of data rates (Block 435), and operations return to Block 430. If, on the other hand, at Block 430 it is determined that the selected performance criterion was not satisfied, then the last data rate at which packets were transmitted where the selected performance criterion was met is saved (e.g., in a memory) (Block 440). A determination is then made as to whether or not the first saved data rate (i.e., the highest data rate achieved using the beamforming algorithm as saved at Block 420) exceeds the second saved data rate (i.e., the highest data rate achieved using a single selected antenna pattern with the switchable ground element coupled to ground as saved at Block 440) (Block 445). If the first saved data rate exceeds the second saved data rate, then the first transmit/receive chain is configured to transmit packets at the first saved data rate with the beamforming algorithm operational (or with the antenna pattern previously selected by the beamforming algorithm) (Block 450). If the first saved data rate does not exceed the second saved data rate, then the first transmit/receive chain is configured to transmit packets at the second saved data rate using the selected antenna pattern that has the switchable ground element coupled to ground (Block 455).

Figure 7:
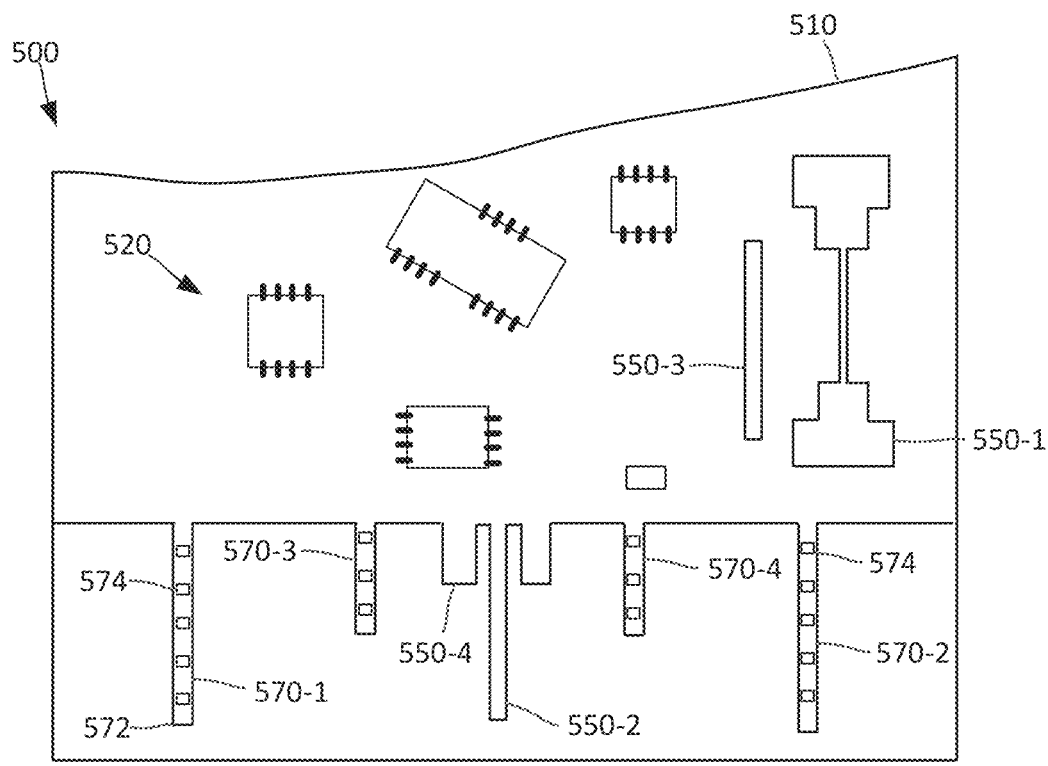
FIG. 7 is a schematic partial bottom view of a main printed circuit board of an access point according to embodiments of the present invention.

FIG. 7 is a schematic partial bottom view of a main printed circuit board 510 of an access point 500 according to embodiments of the present invention. As shown in FIG. 7, a plurality of components 520 may be mounted on the main printed circuit board 510. These components may comprise, for example, various of the components shown in FIG. 3, such as the data encoder or various elements of the transmit/receive chains. A plurality of antennas 550 are formed within the main printed circuit board 510. These antennas include a horizontally polarized slot antenna 550-1 that is configured to transmit and receive signals in the 2.4 GHz frequency band, and a vertically polarized monopole antenna 550-2 that is also configured to transmit and receive signals in the 2.4 GHz frequency band. The horizontally polarized slot antenna 550-1 may be part of a first transmit/receive chain, and the vertically polarized monopole antenna 550-2 may be part of a second transmit/receive chain. The first and second transmit receive chains may be used to transmit packets from the access point 500 to other electronic devices using 2xMIMO transmission techniques in the 2.4 GHz frequency band.

The plurality of antennas 550 further include a horizontally polarized slot antenna 550-3 that is configured to transmit and receive signals in the 5 GHz frequency band, and a vertically polarized U-shaped monopole antenna 550-4 that is also configured to transmit and receive signals in the 5 GHz frequency band. The a horizontally polarized slot antenna 550-3 may be part of a third transmit/receive chain, and the vertically polarized monopole antenna 550-4 may be part of a fourth transmit/receive chain. The third and fourth transmit receive chains may be used to transmit packets from the access point 500 to other electronic devices using 2xMIMO transmission techniques in the 5 GHz frequency band.

A pair of pattern shaping elements 570-1, 570-2 are associated with the vertically polarized 2.4 GHz monopole antenna 550-2. The pattern shaping elements 570-1, 570-2 are each implemented as monopole elements 572. Switches in the form of PIN diodes 574 may be used to selectively couple each monopole element 572 to a ground plane of the main printed circuit board 510. The pattern shaping elements 570-1, 570-2 are formed as directors. As known to those of skill in the art, when a director is coupled to ground it acts as a resonant element that tends to shape the antenna pattern formed by a nearby antenna (that is resonant in the same frequency range as the director) by concentrating the radiated RF energy in the direction of the director. The first director 570-1 may be turned on (i.e., coupled to ground) to increase the gain of the antenna pattern formed by the vertically polarized 2.4 GHz monopole antenna 550-2 in the direction of first director 570-1 (i.e., in the view of FIG. 7, the gain is increased to the left of vertically polarized 2.4 GHz monopole antenna 550-2). Similarly, the second director 570-2 may be turned on to increase the gain of the antenna pattern formed by the vertically polarized 2.4 GHz monopole antenna 550-2 in the direction of second director 570-2 (i.e., in the view of FIG. 7, the gain is increased to the right of vertically polarized 2.4 GHz monopole antenna 550-2). Of course, when the gain of the antenna pattern is increased in a first direction, the gain necessarily decreases in various other directions.

A pair of pattern shaping elements 570-3, 570-4 are similarly associated with the vertically polarized 5 GHz monopole antenna 550-4. The pattern shaping elements 570-3, 570-4 are also implemented as directors in the depicted embodiment, and may be used in the same way as the directors 570-1, 570-2 to shape the radiation pattern of the vertically polarized 5 GHz monopole antenna 550-4.

The use of antennas that have configurable antenna patterns can substantially increase the throughput of an access point. A beamforming algorithm is used to identify the antenna pattern out of a set of possible antenna patterns and a corresponding data rate out of a set of possible data rates that may provide the highest throughput. In many cases, the number of different combinations of antenna patterns (each antenna pattern corresponds to a unique configuration of antenna elements and pattern shaping elements being turned on) and data rates can be very large. The beamforming algorithm is used to identify a combination that provides a high throughput. In many cases, a beamforming algorithm may operate by selecting a first antenna pattern and data rate combination, transmitting packets using that antenna pattern and data rate combination, and then analyzing how that transmission performed (e.g., by analyzing packet error rate or received signal strength data). Rather than testing all possible combinations (which could take a long time and would involve transmitting packets with many antenna patterns that would provide low performance), the beamforming algorithm seeks to quickly converge on an antenna pattern/data rate combination that provides high throughput while only transmitting packets over a small number of antenna pattern/data rate combinations (e.g., twenty).

Unfortunately, conventional beamforming algorithms tend to focus on identifying an antenna pattern that has a shape that increases gain in the direction of the client electronic device and/or that decreases gain in the direction of an interference source. As explained above, in access points that communicate using MIMO transmission techniques, another potentially significant limitation on throughput may be insufficient isolation between the antennas of parallel transmit/receive chains. This is particularly true when the client electronic device is close to the access point. In such circumstances, very high throughputs may potentially be achieved, but if there is insufficient isolation between the parallel channels, the data rate may be drastically reduced (e.g., by an order of magnitude or more). In these circumstances, throughput can be increased by increasing the isolation between the antennas, and the shape of the antenna pattern is not a very important parameter in determining the achievable throughput.

In access point 500, the horizontally polarized 2.4 GHz monopole antenna is in close proximity to the vertically polarized 2.4 GHz monopole antenna, with the two antenna being separated by less than a wavelength at 2.4 GHz. As a result, the isolation between the two antennas 550-1, 550-2 may be less than ideal. Thus, in these circumstances, if a client electronic device is in close proximity to the access point 500, the supportable throughput from the access point 500 to the client electronic device may be limited by the low level of isolation between the two antennas 550-1, 550-2. Pursuant to the present invention, the isolation may be increased by using the director 570-2 as a switchable ground element and coupling director 570-2 to ground. The effect of this is to modify the antenna patterns in a way to decrease coupling between the two antennas 550-1, 550-2. A standard beamforming algorithm, in many cases, might not arrive at this solution. By recognizing that isolation can limit performance, separate tests can be performed to identify the highest supportable data rate for situations where isolation is and is not the limiting factor.

An antenna may have multiple different antenna patterns in which a switchable ground element is coupled to ground. For example, with reference to access point 500, the first antenna 550-1 has two different antenna patterns where director 570-2 (which acts as a switchable ground element) is coupled to ground, namely a first pattern in which both director 570-1 and 570-2 are coupled to ground and a second pattern in which only director 570-2 is coupled to ground. Either of these antenna patterns can be used when transmitting packets to identify the highest supportable data rate that is achievable with the beamforming algorithm turned off and the switchable ground element 570-2 coupled to ground. In some cases, transmissions may be performed using both antenna patterns to see if one antenna pattern provides better performance than the other.

It will also be appreciated that more than one switchable ground element may be associated with a first antenna that can be used to increase the isolation between the first antenna and a second antenna. In such situations, transmissions may optionally be performed to identify the switchable ground element (or combination of switchable ground elements) that can be coupled to ground to increase the isolation between the first and second antennas to support higher throughputs.

Figure 8:
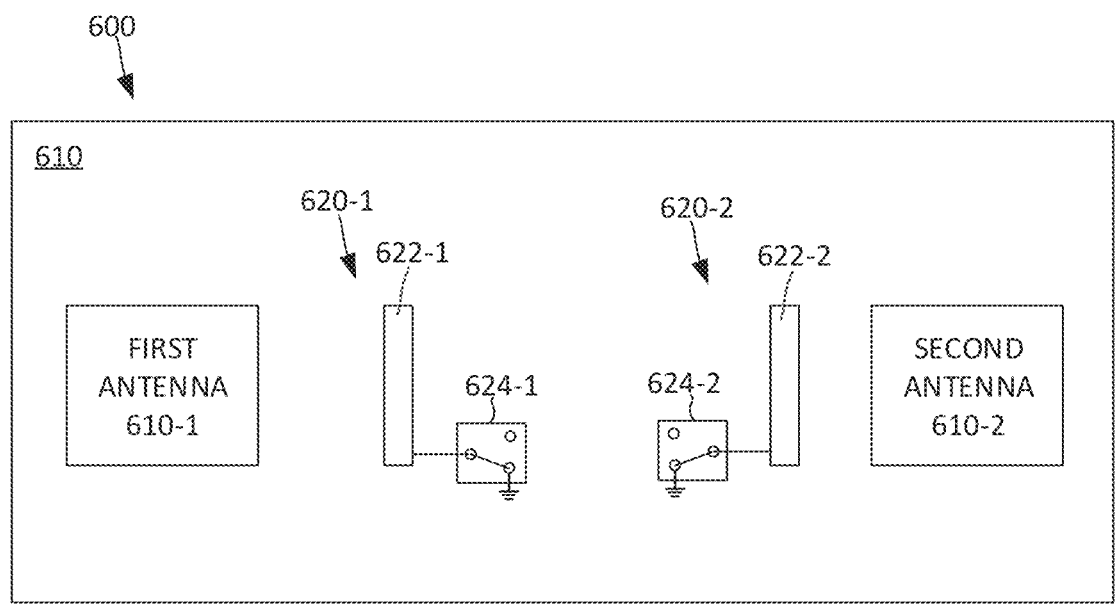
FIG. 8 is a schematic block diagram illustrating how two switchable ground element according to embodiments of the present invention may be positioned between a pair of antennas.

FIG. 8 is a schematic block diagram illustrating how two switchable ground element according to embodiments of the present invention may be positioned between a pair of antennas. As shown in FIG. 8, an access point 600 includes a first horizontally-polarized antenna 610-1 and a second horizontally-polarized antenna 610-2. The first and second horizontally-polarized antennas 610-1, 610-2 may be part of respective first and second transmit/receive chains (not shown) that operate in the same frequency band in order to support MIMO transmission techniques. Because of space limitations on the main printed circuit board 610, the distance between the first and second horizontally-polarized antennas 610-1, 610-2 may be less than desired for purposes of isolation. For example, the distance may be less a wavelength corresponding to the center frequency of the operating frequency band of the first and second horizontally-polarized antennas 610-1, 610-2.

The access point 600 further includes first and second switchable ground elements 620-1, 620-2 that may, for example, be implemented in or mounted on the main printed circuit board 610. Each switchable ground element 620 may include a conductive member 622 that may be selectively coupled to a ground reference via a switch 624 such as a PIN diode. The first switchable ground element 620-1 may be positioned proximate the first antenna 610-1, and the second switchable ground element 620-2 may be positioned proximate the second antenna 610-2. Each switchable ground element 620 may be implemented as a reflector.

As described above, in some circumstances (e.g., when a client electronic device is close to the access point 600), the lack of sufficient isolation between the first and second horizontally-polarized antennas 610-1, 610-2 may limit the throughput between the access point 600 and a client electronic device. In such circumstances, the throughput may be increased by coupling one or both of the switchable ground elements 620 to ground. As discussed above, a reflector is a passive device that may reflect some of the RF energy emitted by an antenna toward the reflector back towards the antenna. Thus, when switchable ground element 620-1 is coupled to ground, the effect will be to reduce the intensity of the antenna beam formed by antenna 610-1 in the direction of antenna 610-2. Similarly, when switchable ground element 620-2 is coupled to ground, the effect will be to reduce the intensity of the antenna beam formed by antenna 610-2 in the direction of antenna 610-1. Thus, by coupling switchable ground elements 620-1, 620-1 to ground, the isolation between antennas 610-1 and 610-2 may be increased. When the antennas 610-1, 610-2 are positioned as shown in FIG. 8, the use of reflectors to form the switchable ground elements 620 may be particularly advantageous as they shape the antenna beams in a manner that may increase the isolation between the two antennas 610-1, 610-2.

Figure 9:
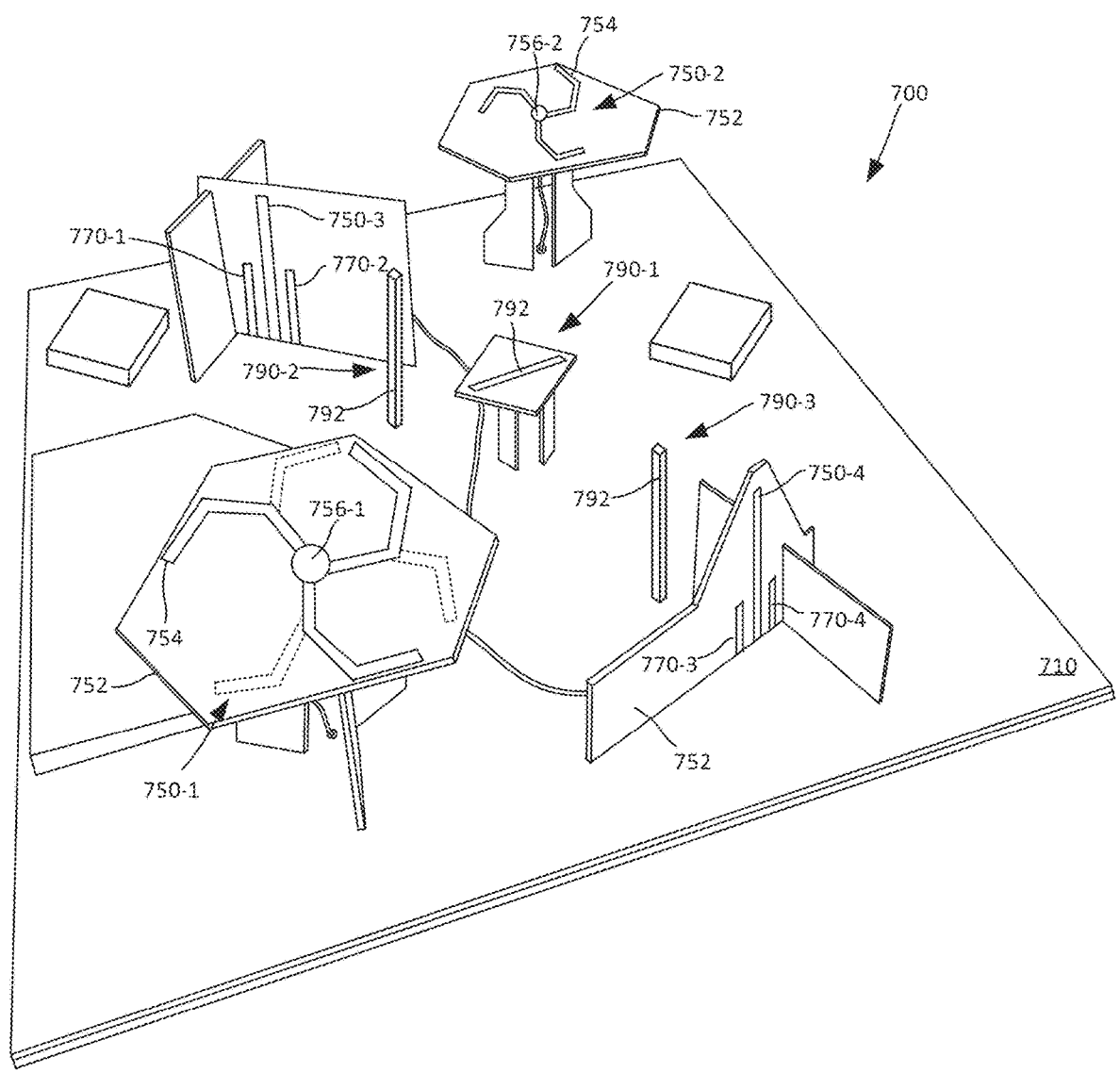
FIG. 9 is a schematic bottom view of various internal electronic components of a Wi-Fi access point according to further embodiments of the present invention.

FIG. 9 is a schematic bottom view of various internal electronic components of a Wi-Fi access point 700 according to further embodiments of the present invention. An exterior housing of access point 700 is omitted from FIG. 9 in order to show selected internal electronic components of the access point 700. A plurality of baseband and RF electronic components of the access point 700 (mostly not shown) including, for example, baseband circuitry, radios, a processor, a memory, duplexers, diplexers, RF amplifiers and the like may be mounted on a main printed circuit board 710 (most of these elements are mounted on the top side of the main printed circuit board 710 to reduce interference with the radiating elements).

A plurality of antennas 750 are mounted to extend downwardly from the main printed circuit board 710 (note that in the view of FIG. 9 access point 700 is upside down from the orientation in which it will be mounted for use). These antennas include first and second horizontally polarized antennas 750-1, 750-2, which are configured to transmit and receive signals in the 2.4 GHz frequency band. The first and second horizontally polarized antennas 750-1, 750-2 each comprise a radiator printed circuit board 752 that is mounted on the main printed circuit board 710 by three supports. Three dipole radiators 754 are formed on each radiator printed circuit board 752. As shown for antenna 750-1, each dipole radiator 754 may comprise a pair of dipole arms, with the first dipole arm formed on the bottom side of the radiator printed circuit board (shown in solid lines) and the second dipole arm formed on the top side of the radiator printed circuit board (shown in dashed lines). The dipole radiators 754 are connected to respective common feed points 756-1, 756-2 on the radiator printed circuit board 752. The second dipole arms are not shown for antenna 750-2 to simplify the figure. The dipole radiators 754 are mounted to extend in parallel to an RF ground plane that is formed in the main printed circuit board 710, and are situated a predetermined distance forwardly of this RF ground plane (here the forward direction corresponds to the downward direction when the Wi-Fi access point 700 is mounted on a ceiling). In some embodiments, the predetermined distance may be about ¼ of the operating wavelength of the antennas 750-1, 750-2. The three dipole radiators 754 of each antenna 750-1, 750-2 may be configured, for example, to generate a generally semi-spherical radiation pattern or "antenna beam" that extends a full 360° in the azimuth (horizontal) plane when all three dipole radiators 754 of one of the antennas 750-1, 750-2 are connected to the feed point 756. Thus, the antenna 750-1, 750-2 may provide generally omnidirectional coverage in the downward and sideward directions. The RF ground plane will mostly reflect upwardly-directed radiation back downwardly, which is why the radiating pattern may have a generally semi-spherical shape as opposed to true omnidirectional (generally spherical) coverage.

Switches such as PIN diodes (not visible in FIG. 9) may be used to selectively connect one or more of the dipole radiators 754 of each antenna 750-1, 750-2 to the respective feed points 756-1, 756-2. As such, each antenna 750-1, 750-2 can generate seven different antenna patterns by coupling either one, two or all three of the three dipole radiators 754 to the respective RF feed points 756-1, 756-2.

The antennas 750 further include first and second vertically polarized antennas 750-3, 750-4 that are also configured to transmit and receive signals in the 2.4 GHz frequency band. Each vertically polarized antenna 750-3, 750-4 is implemented as a monopole antenna that is formed on a separate radiator printed circuit board 752 that is mounted to extend downwardly from the main printed circuit board 710. Each antenna 750-1 through 750-4 may be part of a respective transmit/receive chain. Thus, the access point 700 may transmit using 4xMIMO communications in the 2.4 GHz frequency band.

The first vertically polarized antenna 750-3 includes an associated first pair of pattern shaping elements 770-1, 770-2, and the second vertically polarized antenna 750-4 includes an associated second pair of pattern shaping elements 770-3, 770-4. The pattern shaping elements 770-1 through 770-4 are each implemented as directors that are positioned adjacent their associated antenna element 750-3, 750-4. Switches (e.g., PIN diodes) which are not separately shown in FIG. 9 may be used to selectively couple each director 770-1 through 770-4 to a ground plane of the main printed circuit board 710 in order to selectively shape the antenna patterns formed by the vertically polarized antennas 770-3, 770-4.

The access point may also include transmit/receive chains (including antennas) that operate in the 5 GHz band, but these components are not shown in FIG. 9 to simplify the drawing.

The access point 700 further includes a first switchable ground element 790-1 that is positioned between the first and second horizontally polarized antennas 750-1, 750-2. The switchable ground element 790-1 is implemented as a conductive trace 792 on a raised printed circuit board that is connected to a ground reference via a switch (not shown). The switchable ground element 790-1 may be coupled to ground in situations where throughput is being limited because of insufficient isolation between the first and second horizontally polarized antennas 750-1, 750-2.

The access point 700 further includes second and third switchable ground elements 790-2, 790-3 that are positioned between the first and second vertically polarized antennas 750-3, 750-4. The switchable ground elements 790-2, 790-3 are each implemented as metallic members 792 that are mounted to extend downwardly from the main printed circuit board 710. Each metallic member 792 is connected to a ground reference via a respective switch (not shown). The switchable ground elements 790-2, 790-3 may be coupled to ground in situations where throughput is being limited because of insufficient isolation between the first and second vertically polarized antennas 750-3, 750-4.

Figure 10A:
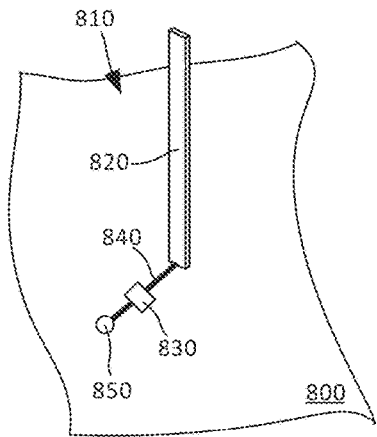
FIGS. 10A-10C are schematic perspective views of switchable ground elements according to certain embodiments of the present invention.
Figure 10B:
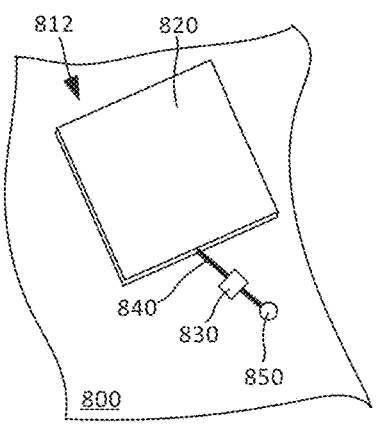
Figure 10C:
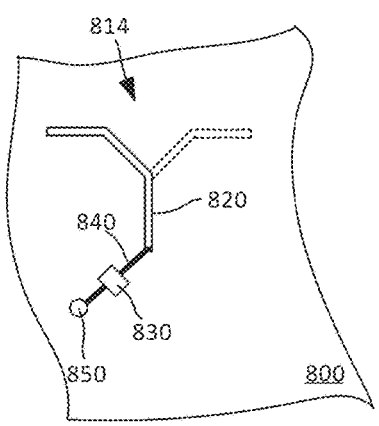

FIGS. 10A-10C are schematic perspective views of switchable ground elements according to certain embodiments of the present invention. Referring first to FIG. 10A, a switchable ground element 810 is shown that is mounted to extend upwardly (or downwardly) from a printed circuit board 800 of an access point. The printed circuit board 800 may comprise, for example, a main printed circuit board of the access point. The switchable ground element 810 includes a conductive member 820 that is coupled to a ground reference via a switch 830. the switch 830 may comprise, for example, a PIN diode or any other electrically controlled switch. A trace 840 on the printed circuit board 800 may connect the conductive member 820 to the ground reference which may comprise, for example, a ground plane (not visible) that is formed on the opposite side of the main printed circuit board 800. The switch 830 may be interposed along the trace 840. A conductive via 850 may connect the trace 840 to the ground reference.

Referring to FIG. 10B, a switchable ground element 812 is shown that is in the form of a metal patch that is implemented in or on the printed circuit board 800 of the access point. Referring to FIG. 10C, a switchable ground element 814 is shown that is in the form of a dipole radiator that is implemented in the printed circuit board 800 of the access point. The remaining elements of FIGS. 10B and 10C may be the same as shown in FIG. 10A, and hence further description thereof will be omitted.

Figure 11:
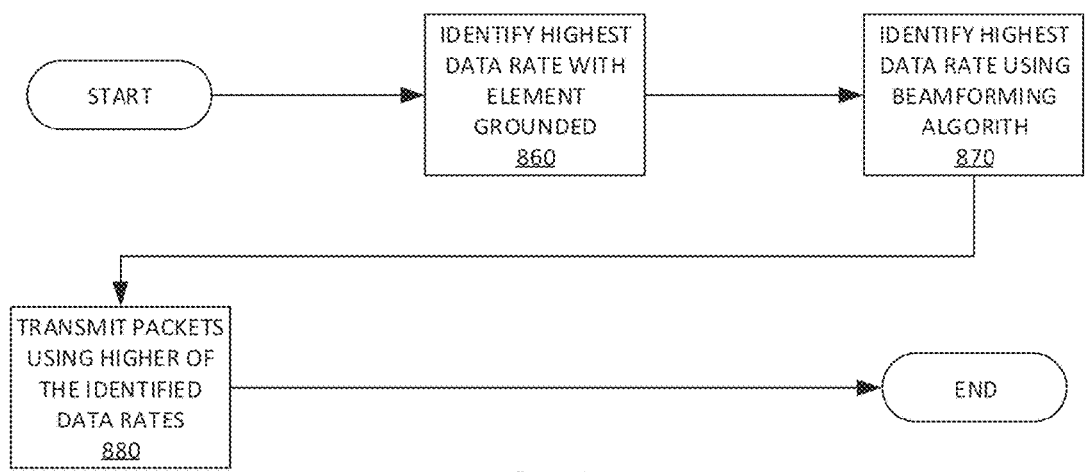
FIG. 11 is a flow chart of an example of a method of operating an access point according to further embodiments of the present invention.

FIG. 11 is a flow chart of an example of a method of operating an access point according to embodiments of the present invention. The access point may include a first antenna, a second antenna and a switchable ground element that comprises a conductive member that is connected to an electrical ground reference via an electronically controlled switch.

As shown in FIG. 11, operations may begin with the access point identifying a first data rate at which packets can be transmitted to a client electronic device through the first antenna when the first antenna unit is set to have a selected antenna pattern (Block 860). The selected antenna pattern is an antenna pattern that is formed when the conductive member of the switchable ground element is coupled to ground, and the first data rate is the highest data rate in a set of data rates at which the packets can be transmitted while satisfying a selected performance criterion. Next, the access point may identify a second data rate at which packets can be transmitted to the client electronic device through the first antenna using an antenna pattern that is identified by a beamforming algorithm (Block 870). Then the access point may transmit packets to the client electronic device at the higher of the first data rate and the second data rate, where the antenna pattern for the first antenna is the antenna pattern identified by the beamforming algorithm if the second data rate exceeds the first data rate, and is the selected antenna pattern if the first data rate exceeds the second data rate (Block 880).

It will be appreciated that FIGS. 5-6 and 11 illustrates specific examples of methods according to embodiments of the present invention. In other embodiments, the methods illustrated in FIGS. 5-6 and 11 may include additional or fewer operations. Furthermore, the order of the operations shown in FIGS. 5-6 and 11 may be changed, and/or two or more operations may be combined into a single operation.

It will be appreciated that the communications techniques disclosed herein may also be incorporated into a beamforming algorithm so that a single algorithm is used to determine the settings for the switchable ground elements, the settings for any other pattern shaping elements and/or switchable antenna elements, and the MCS data rate. Such a beamforming algorithm may be configured to couple one or more of the switchable ground elements to a ground reference while transmitting packets or frames at different data rates in order to determine a maximum data rate that can be achieved with the switchable ground element configured to provide isolation between the antenna at issue and another antenna that is simultaneously being used for MIMO transmissions.

While the above-described embodiments of the present invention include particular numbers and arrangements of components, in other embodiments there may be additional or fewer components, two or more components may be combined into a single component, and positions of one or more components may be changed.

Figure 12:
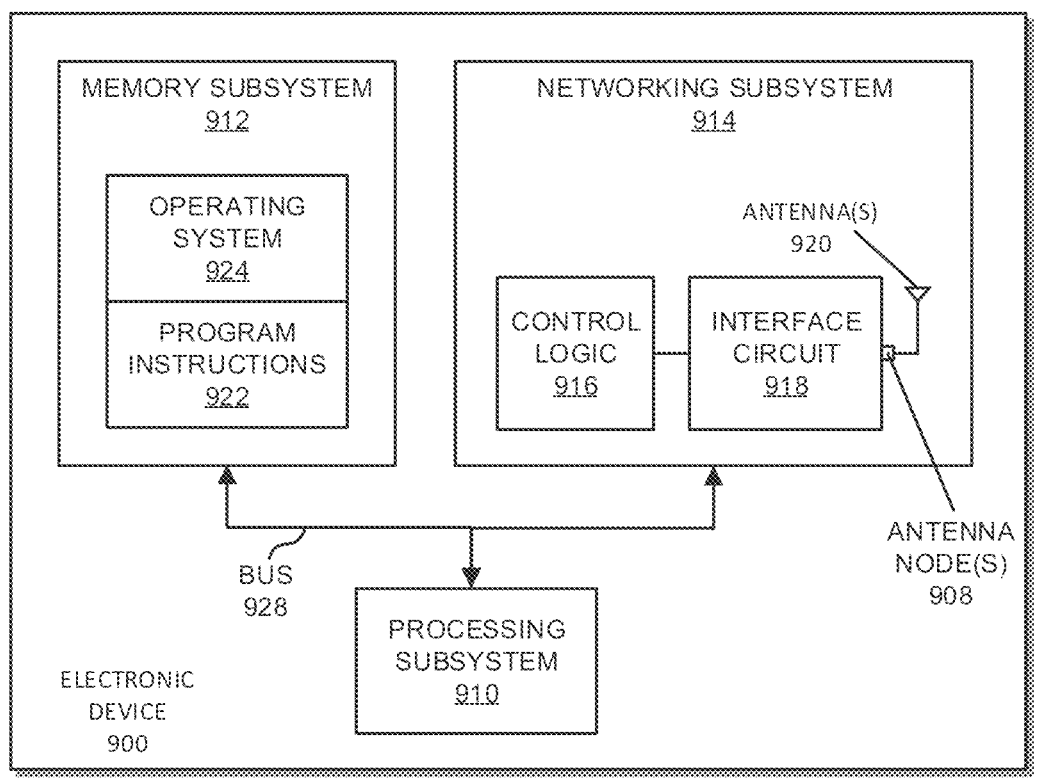
FIG. 12 is a block diagram illustrating an example of an electronic device in accordance with an embodiment of the present invention.

FIG. 12 is a block diagram illustrating an electronic device 900 in accordance with some embodiments. The electronic device 900 may be, for example, one of the above-discussed access points. The electronic device 900 includes a processing subsystem 910, a memory subsystem 912, and a networking subsystem 914. Processing subsystem 910 includes one or more devices configured to perform computational operations. Memory subsystem 912 includes one or more devices for storing data and/or instructions. In some embodiments, the instructions may include an operating system and one or more program modules which may be executed by processing subsystem 910.

Networking subsystem 914 includes one or more devices configured to couple to and communicate on a wired and/or wireless network (i.e., to perform network operations), including: control logic 916, an interface circuit 918 and one or more antennas 920 (or antenna elements). While FIG. 12 includes an antenna 920, in some embodiments electronic device 900 includes one or more nodes, such as nodes 908, e.g., a connector, which can be coupled to one or more antennas 920 that are external to the electronic device 900. Thus, electronic device 900 may or may not include the one or more antennas 920. Networking subsystem 914 includes at least a networking system based on the standards described in IEEE 802.11 (e.g., a Wi-Fi networking system).

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting frames and/or scanning for frames transmitted by other electronic devices.

Processing subsystem 910, memory subsystem 912, and networking subsystem 914 are coupled together using bus 928. Bus 928 may include an electrical, optical, and/or electro-optical connection that the subsystems can use to communicate commands and data among one another.

Electronic device 900 can be (or can be included in) any electronic device with at least one network interface. For example, electronic device 900 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

The operations performed in the communication techniques according to embodiments of the present invention may be implemented in hardware or software, and in a wide variety of configurations and architectures. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918.

While embodiments of the present invention have been described primarily with reference to access points, it will be appreciated that the techniques described herein may be implemented in other electronic devices. For example, in other embodiments, the devices described above may comprise client electronic devices.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

While example embodiments have been disclosed above, it will be appreciated that the techniques described herein are widely applicable and that the invention is not limited to the embodiments shown. For example, in some embodiments the RF ground plane may not be implemented as a metal layer in a printed circuit board and instead is implemented in another fashion (e.g., as a sheet metal RF ground plane). The techniques according to embodiments of the present invention are equally applicable with such other types of RF ground plane implementations.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

It will be understood that when an element is referred to as being "on," "coupled to" or "connected to" another element, the element may be formed directly on, coupled to or connected to the other element, or there may be one or more intervening elements therebetween.

Terms such as "top," "bottom," "upper," "lower," "above," "below," and the like are used herein to describe the relative positions of elements or features. For example, when an upper part of a drawing is referred to as a "top" and a lower part of a drawing is referred to as a "bottom" for the sake of convenience, in practice, the "top" may also be called a "bottom" and the "bottom" may also be a "top" without departing from the teachings of the inventive concept.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

Aspects and elements of all of the embodiments disclosed above can be combined in any way and/or combination with aspects or elements of other embodiments to provide a plurality of additional embodiments.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed is:

1. A communication method, comprising:
   providing an access point that includes:
      a data encoder;
      a first transmit/receive chain that is coupled to the data encoder, the first transmit/receive chain including a first antenna that is configured to operate in a first frequency band;
      a second transmit/receive chain that is coupled to the data encoder, the second transmit/receive chain including a second antenna that is configured to operate in the first frequency band; and
      a switchable ground element that includes a conductive member that is connected to a ground reference via a switch;
   selecting an antenna pattern for the first antenna from a plurality of antenna patterns, wherein the selected antenna pattern is one of the plurality of antenna patterns that is formed when the conductive member of the switchable ground element is coupled to the ground reference; and
   identifying a first data rate at which packets can be transmitted to a client electronic device using the first transmit/receive chain with the first antenna set to generate the selected antenna pattern, wherein the first data rate is a highest data rate of a set of data rates at which the packets can be transmitted to the client electronic device with the first antenna set to generate the selected antenna pattern while satisfying a selected performance criterion.

2. The method of claim 1, further comprising identifying a second data rate at which packets can be transmitted to the client electronic device using the first transmit/receive chain, wherein the second data rate is identified using a beamforming algorithm for the first antenna.

3. The method of claim 2, wherein the second data rate is the highest data rate of the set of data rates at which the packets can be transmitted to the client electronic device while satisfying the selected performance criterion when the first antenna has one of the plurality of antenna patterns that is identified by the beamforming algorithm.

4. The method of claim 3, further comprising transmitting packets to the client electronic device at the higher of the first data rate and the second data rate, where the antenna pattern for the first antenna is the one of the antenna patterns that is identified by the beamforming algorithm if the second data rate exceeds the first data rate, and is the selected antenna pattern if the first data rate exceeds the second data rate.

5. The method of claim 2, wherein identifying the second data rate comprises:
   using the beamforming algorithm to identify one of the plurality of antenna patterns for the first antenna to use with respect to communications between the access point and the client electronic device;
   transmitting additional packets through the first antenna to the client electronic device using the identified antenna pattern, where the additional packets are transmitted at two or more data rates in the set of data rates; and
   identifying whether the selected performance criterion is met for the additional packets transmitted at each of the two or more data rates in the set of data rates to identify the second data rate.

6. The method of claim 1, wherein identifying the first data rate comprises:
   setting the electronically controlled switch of the switchable ground element so that the conductive member is electrically connected to the ground reference;

transmitting additional packets to the client electronic device using the first transmit/receive chain with the first antenna set to generate the selected antenna pattern, where the additional packets are transmitted at two or more data rates in the set of data rates, and identifying whether the selected performance criterion is met for the additional packets transmitted at each of the two or more data rates in the set of data rates to identify the first data rate.

7. The method of claim 1, wherein the switchable ground element is configured to increase isolation between the first and second antennas when the conductive member is coupled to the ground reference.

8. The method of claim 1, wherein the conductive member comprises a reflector.

9. The method of claim 1, wherein the switchable ground element is positioned between the first antenna and the second antenna.

10. The method of claim 1, wherein the first and second antennas are separated by a distance that is less than a wavelength at a center frequency of the first frequency band.

11. The method of claim 1, wherein the performance criterion is a packet error rate.

12. A method of operating an access point having a first antenna and a second antenna and a switchable ground element that comprises a conductive member that is connected to an electrical ground reference via an electronically controlled switch, the method comprising:

identifying a first data rate at which packets can be transmitted to a client electronic device through the first antenna when the first antenna unit is set to generate a selected antenna pattern that is an antenna pattern that is formed when the conductive member of the switchable ground element is coupled to ground, wherein the first data rate is a highest data rate of a set of data rates at which the packets can be transmitted while satisfying a selected performance criterion;

identifying a second data rate at which packets can be transmitted to the client electronic device through the first antenna using an antenna pattern that is identified by a beamforming algorithm; and transmitting packets to the client electronic device at the higher of the first data rate and the second data rate, where the antenna pattern for the first antenna is the antenna pattern identified by the beamforming algorithm if the second data rate exceeds the first data rate, and is the selected antenna pattern if the first data rate exceeds the second data rate.

13. The method of claim 12, wherein the switchable ground element is configured to increase isolation between the first and second antennas when coupled to the ground reference.

14. The method of claim 12, wherein the conductive member is configured to be resonant at the center frequency of an operational frequency band of the first antenna.

15. The method of claim 12, wherein the first antenna and the second antenna are configured to transmit signals having a same polarization.

16. The method of claim 12, wherein a first distance between the first antenna and the second antenna is greater than a second distance between the first antenna and the switchable ground element and is also greater than a third distance between the second antenna and the switchable ground element, and wherein the switchable ground element comprises a reflector.

17. The method of claim 12, wherein a first distance between the first antenna and the second antenna is less than either a second distance between the first antenna and the switchable ground element or a third distance between the second antenna and the switchable ground element, and wherein the switchable ground element comprises a director.

18. The method of claim 12, wherein a first radio that is connected to the first antenna and a second radio that is connected to the second antenna are both mounted on a main printed circuit board of the access point, and wherein the first antenna is formed in the main printed circuit board.

19. The method of claim 18, wherein the second antenna and the conductive member of the switchable ground element are also formed in the main printed circuit board.

20. The method of claim 12, wherein the first and second antennas are separated by a distance that is less than a wavelength at a center frequency of an operating frequency band of the first antenna.

* * * * *